United States Patent
Grellner (12)

(10) Patent No.: US 6,685,120 B2
(45) Date of Patent: Feb. 3, 2004

(54) HAY BALE SEPARATING APPARATUS AND METHOD

(76) Inventor: Kenny Grellner, Rte. 1 Box 37, Hennessey, OK (US) 73742

( * ) Notice: Subject to any disclaimer, the term of this patent is extended or adjusted under 35 U.S.C. 154(b) by 213 days.

(21) Appl. No.: 10/035,285

(22) Filed: Jan. 3, 2002

(65) Prior Publication Data

US 2002/0053614 A1 May 9, 2002

Related U.S. Application Data

(63) Continuation-in-part of application No. 09/416,119, filed on Oct. 12, 1999.

(51) Int. Cl.⁷ .......................... B02C 18/06; B02C 19/12
(52) U.S. Cl. ....................... 241/605; 241/30; 241/282.1
(58) Field of Search ...................... 241/30, 605, 282.1; 414/24.6, 24.5

(56) References Cited

U.S. PATENT DOCUMENTS

| 3,129,739 A | * | 4/1964 | Wenger ........................ 241/55 |
| 3,570,732 A | * | 3/1971 | Merck .......................... 225/94 |
| 3,920,542 A | * | 11/1975 | Laird et al. .................. 209/134 |
| 3,999,674 A | | 12/1976 | Meitl |
| 4,088,272 A | | 5/1978 | Grillot |
| 4,360,167 A | * | 11/1982 | Beccalori et al. ........... 241/274 |
| 4,549,840 A | * | 10/1985 | Ansbjer ....................... 414/24.5 |
| 4,657,191 A | | 4/1987 | Dwyer et al. |
| 4,923,128 A | | 5/1990 | Ostrowski |
| 5,025,992 A | | 6/1991 | Niebur |
| 5,033,683 A | * | 7/1991 | Taylor ...................... 241/101.2 |
| 5,090,629 A | * | 2/1992 | Pinto et al. ............... 241/282.1 |
| 5,090,630 A | | 2/1992 | Kopecky et al. |
| 5,217,174 A | * | 6/1993 | Martin et al. ................ 241/222 |
| 5,221,053 A | * | 6/1993 | Pinto et al. .................... 241/58 |
| 5,340,040 A | * | 8/1994 | Bussiere et al. ...... 241/101.761 |
| 5,556,041 A | * | 9/1996 | Cheesman et al. ........ 241/24.14 |
| 5,738,287 A | | 4/1998 | Vanderberg |

\* cited by examiner

*Primary Examiner*—William Hong
(74) *Attorney, Agent, or Firm*—Edward L. White

(57) ABSTRACT

The present invention related to devices for mechanically separating hay bales. More particularly, the present invention relates to devices intended to flake rather then shred or grind bales. The invention is of the type having a horizontal main frame, a biasing means thereon for moving a hay bale, a separation means toward which the biasing means moves the bale, and a transportation means for moving the bale to the locate at which hay is desired to be flaked. The improvement of the present invention is a separation means comprised of a flaking shaft on substantially the same plane as the support surface, the shaft having at least one flaking sprocket mounted thereon with at least one tooth with a concave leading edge and a convex trailing edge, the two edges meeting in a tip, and the shaft driven so as to rotate at a low speed so that the concave edge of the tooth engages the bale on the up stroke gently separating the bale into flaked portions and discharging the flaked portions up and away from the separating means.

10 Claims, 4 Drawing Sheets

HAY BALE SEPARATING APPARATUS AND METHOD

CROSS REFERENCES TO RELATED APPLICATIONS

This is a continuation-in-part of Ser. No. 09/416,119 filed Oct. 12, 1999.

BACKGROUND OF THE INVENTION a. Field of the Invention

The invention relates to devices for mechanically separating hay bales. More particularly, the present invention relates to devices intended to flake rather than shred hay bales.

b. Description of the Prior Art

Crop materials such as hay, silage, stubble, and the like are commonly stock piled in bales taking various forms such as square or round. These bales are typically held together by twine or wire.

There are a wide variety of machines which create the bales themselves. There are also a wide variety of machines intended to process baled crop materials.

In some cases, it may be desirable to shred the baled crop material. For example, where the hay is to be used as bedding for animals, shredding may be desirable. Also, where the baled material is to be worked into the soil, it may be desirable to shred it. U.S. Pat. No. 4,923,128 to Ostrowski. Ostrowski discloses a device intended to be mounted on the front end loader linkage of a tractor. The frame carries a horizontal conveyor construction which has an inclined ramp at a forward end so that the ramp can be inserted underneath the bale to slide the ramp and conveyor under the bale and lift the bale onto the conveyor system. The conveyor moves the bale toward one side of the device at which a shredder roller is provided with a suitable duct housing to direct material out one side of the implement. A deflector can be used to direct the shredded material in to feed bunks or the like. A device intended to perform a similar purpose is disclosed by Niebur in U.S. Pat. No. 5,025,992. Niebur's apparatus differs from that of Ostrowski, however, because Ostrowski uses a rotating shaft with fingers thereon to shred the bale. Niebur uses a plurality of side-by-side elongated walker members. The elongated walker members move away from the bale in an upward stroke and then engage the bale in a downward stroke pulling off bits of hay. Niebur's method purports to avoid problems with clogging which are inherent to the rotational shredding of a hay bale.

However, in many applications it is not desirable to shred the bale. Rather, for use in feeding livestock, it is desirable to have larger chunks of hay pulled off of the bale in a relatively gentle manner. Thus, fewer small pieces of hay, which tend to get ground into the soil or fall out of the bottom of a feeding apparatus, rather than being consumed by an animal, are avoided. In U.S. Pat. No. 5,738,287 to Vanderberg, a separator is disclosed which acts substantially without chopping the bale materials as is desirable for use in feeding hay to livestock. Vanderberg discloses his device as being mounted on a trailer for towing. However, despite the fact that he purports to disclose a device that does not shred the bale, Vanderberg's device separates the bale with a rotational shaft having fingers mounted thereon. The fingers are disclosed as being rotatably connected to the shaft. Thus, the shaft must be rotated at a relatively high rate of speed so that centrifugal force forces the fingers to extend in an outward direction from the shaft. If the shaft is rotated at a slower speed, the fingers remain close to the shaft and will no perform their function in separating the bale. Another downfall of the Vanderberg device is the fact that the fingers engage the bale in a downward direction. This tends to force the separated hay material against a support surface on the device. Thus, there is a shearing effect, which causes the separated material to become broken into smaller portions. While Vanderberg recognized the importance of avoiding chopping the hay, his device is not entirely successful in accomplishing the objective. Further, even to the extent that the Vanderberg device does not chop the hay, it does separate it into very small portions.

Therefore, it is desirable to have a hay separation device which flakes the hay into large chunks rather than chopping or otherwise finely separating it.

SUMMARY OF THE INVENTION

In view of the foregoing disadvantages inherent in the known types of devices for mechanically separating hay bales, it is an object of the invention to provide an apparatus which overcomes the various disadvantages of the prior art. It is therefore an object of the invention to provide an improved bale separator. More particularly, it is an object of the invention to provide an apparatus which flakes a hay bale rather than shredding or chopping it.

The present hay flaking apparatus is suitable for bales susceptible to flaking. In its preferred embodiment, the hay flaking apparatus is more efficient in separating large square bales. The separator acts to "flake" the bale into large chunks rather than chopping or grinding the hay material. The present invention allows a single operator to easily flake and distribute the hay in a single operation.

The present invention is an improved hay bale separating apparatus of the type having a horizontal main frame defining a substantially flat support surface with a front edge, a rear edge, and a first and second side; a biasing means for moving a hay bale placed on the support surface toward the first side; a separation means on the first side for separating the hay bale into smaller portions; and a transportation means for moving the apparatus and bale thereon to place where the bale is to be separated and disbursed. The improvement of the present invention comprises a shaft on substantially the same plane as the support surface with at least one flaking sprocket mounted thereon, the sprocket bearing at least one tooth with a concave leading edge and a convex trailing edge meeting at a tip, the shaft driven to rotate so that the concave leading edge engages the bale on the up stroke thereby gently separating the bale into flaked portions and discharging the flaked portions up and away from the separating means so that the flaked portions remain relatively large and unbroken. In a preferred embodiment, there are two flaking sprockets on the flaking shaft, each sprocket having three teeth thereon.

It is an object of the present invention to provide a biasing means for moving the hay bale towards the flaking mechanism. In a preferred embodiment the biasing means comprises a push bar which engages the side of the bale forcing toward the flaking mechanism. Alternatively, the biasing means may be a conveyor belt or any other suitable mechanism. It is also an object of the present invention to provide a plurality of transportation means for the present invention. In one embodiment, the hay flaking apparatus is mounted on the front end loader of a tractor. This allows the hay flaker to be raised, lowered, an tilted as needed. Further, there is an easy loading mechanism, which is less problematic than that disclosed by Ostrowski in U.S. Pat. No. 5,923,128, using the present invention. Ostrowski discloses a ramp on the front of his bale shredding and dispensing device. He describes placing the device flat on the ground, then sliding it forward forcing the bale up the ramp and onto the device. There are multiple problems with this loading method, including, but not limited to, the fact that if the device is not placed perfectly flat on the ground, it is likely that the ramp may engage the soil forcing it up onto the platform of the apparatus. The soil can then get into the mechanism causing wear and tear. In addition, the soil can be cast out with the hay. With the present invention, the hay flaking apparatus is disposed over the bale at an angle. A guide rail engages the bale so that when the platform is tilted from an angle to horizontal, the bale tilts under the force of the guide rail and is loaded onto the platform. This prevents the problem noted above with Ostrowski where soil get onto the apparatus. Alternatively, the present invention can be hauled on a trailer, similar to the configuration disclosed by Vanderberg in U.S. Pat. No. 5,738,287.

It is a further object of the present invention to provide a hay flaking apparatus which requires less horsepower than prior art devices. Previously, hay separating devices typically required the rotation of a shaft at a relatively high rate of speed. In addition to rotating the shaft at a relatively high rate of speed, a substantial amount of torque was required to shred the hay material. The present invention rotates a shaft at a very low speed. In addition, since the object is not to shred the hay, but rather simply to flake it, there is very little speed and relatively little torque required.

The heart of the present invention however is the flaking sprocket. The flaking sprocket has at least one tooth with a concave leading edge and a convex trailing edge meeting at a tip. The shaft drives the flaking sprocket at a slow rate of speed so that it engages the bale on the up stroke. The bale is thereby gently separated into flaked portions and discharged up and away from the apparatus so that the flaked portions remain relatively large and unbroken.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description makes reference to the annexed drawings wherein.

DETAILED DESCRIPTION OF PREFERRED EMBODIMENTS

Figure 1:
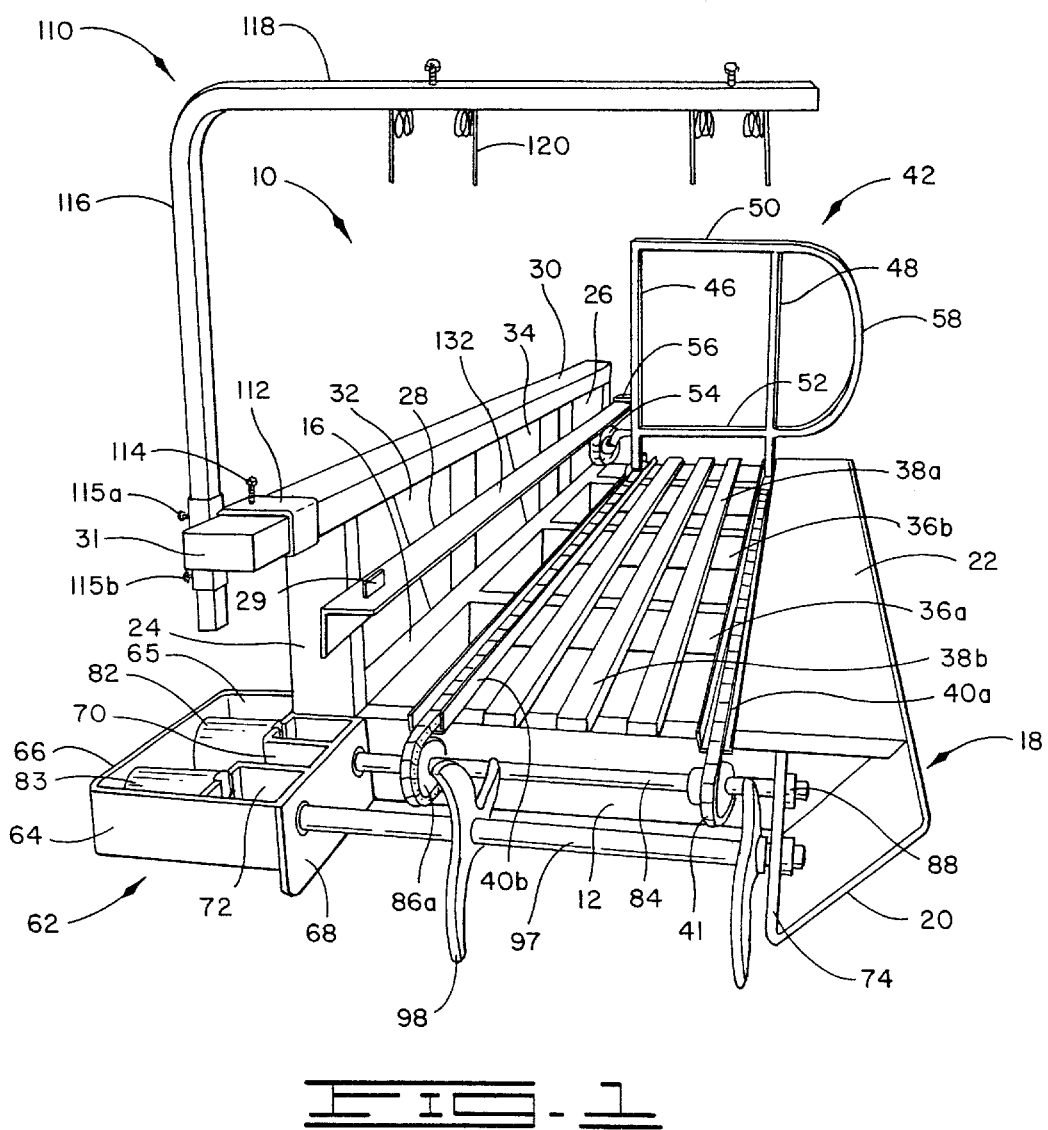
FIG. 1 is a perspective view of the hay flaking apparatus looking primarily at the side where the flaking mechanism is located.

Referring now to the drawings, where like numerals represent like or parts, the hay flaking apparatus 10 is shown generally in FIG. 1. The view in FIG. 1 is a perspective looking at what will be referred to as the left side of the apparatus 10. The apparatus 10 is generally intended to be mounted on the front end loader linkage of a tractor 11 (not shown). However, the apparatus 10 could also be mounted on a trailer to be pulled behind a tractor 11 or could be mounted on a truck bed or the like.

The apparatus 10 generally consists of a left mainframe member 12, corresponding right mainframe member 14, and a rear and front mainframe member 16 and 18, respectively, spanning there between. These four mainframe members 12 through 18 comprise the main structural members of the apparatus 10. The front mainframe member 18 is further comprised of an angles front plate 20 and a front support plate 22. Extending upwardly at the junction of the left mainframe member 12 and the rear mainframe member 16 is a left upright 24. A corresponding right upright 26 extends upwardly at the junction of the right mainframe member 14 and the rear mainframe member 16. At the top of the two uprights, 24 and 26, is a top rail 30 spanning there between. Preferably, the top rail 30 extends outwardly beyond the left upright 24. The portion of the top rail 30 that extends outwardly terminates in a proximal end 31. Spanning between the left mainframe member 12 and the right mainframe member 14 disposed vertically between the rear mainframe member 16 and the top rail 30 is a guide rail 28. Preferably, the guide rail 28 has a horizontal lip 132 extending outwardly therefrom towards the front of the apparatus 10. On an upper surface of the horizontal lip 132, a push bar stop block 29 is mounted near the left side of the apparatus 10.

Cross members 36 run parallel to the left and right mainframe members, 12 and 14, between the rear and front mainframe members, 16 and 18. Support rails 38 run parallel to the rear and front mainframe members, 16 and 18, supported on the support rails 38 and the left and right mainframe members, 12 and 14. A support rail 38 along with the front support plate 22 cooperate to form the support platform.

Chain rails 40 are also supported by the cross members 36 in a direction substantially parallel to the support rails 38. Chain rails 40 have a substantially C-like shape in which the chain 41 rests. The chains 41 pass around a left chain sprocket 86 mounted on the left chain shaft 84 down and through the chain return guides 60 which are substantially parallel with the chain rails 40, and in line therewith, but disposed there below. Thence, the chain 41 passes around the right chain sprocket 92 mounted on the right chain shaft 90. Each of the chain shafts is supported by chain bearings (88 for the left chain bearing and 94 for the right chain bearing) thus, the chain shafts 84 and 90 are allowed to rotate freely.

A push bar 42 is attached to the chains via horizontal feet 44. Thus, as the chain 41 moves, the push bar 42 is forced to move along. The push bar 42 is comprised of a left push bar upright 46, a right push bar upright 48, substantially parallel with the left push bar upright 46, a push bar top cross member 50 passing between the upper most portions of the left and right push bars, 46 and 48, and a push bar lower cross member 52 disposed between the top cross member and the horizontal feet 44. A U-shaped portion 58 is attached to one side of the push bar 42. Attached to the other side of the push bar 42 is a guide wheel 54 and a push bar stop 56. The guide wheel 54 extends outwardly from the push bar 42 and rotatingly engages one side of the horizontal lift 132. The push bar stop 56 also extends outwardly from the push bar 42 adjacent to the guide wheel 54. It moves along an opposite side of the horizontal lift 132 from the guide wheel 54.

Figure 2:
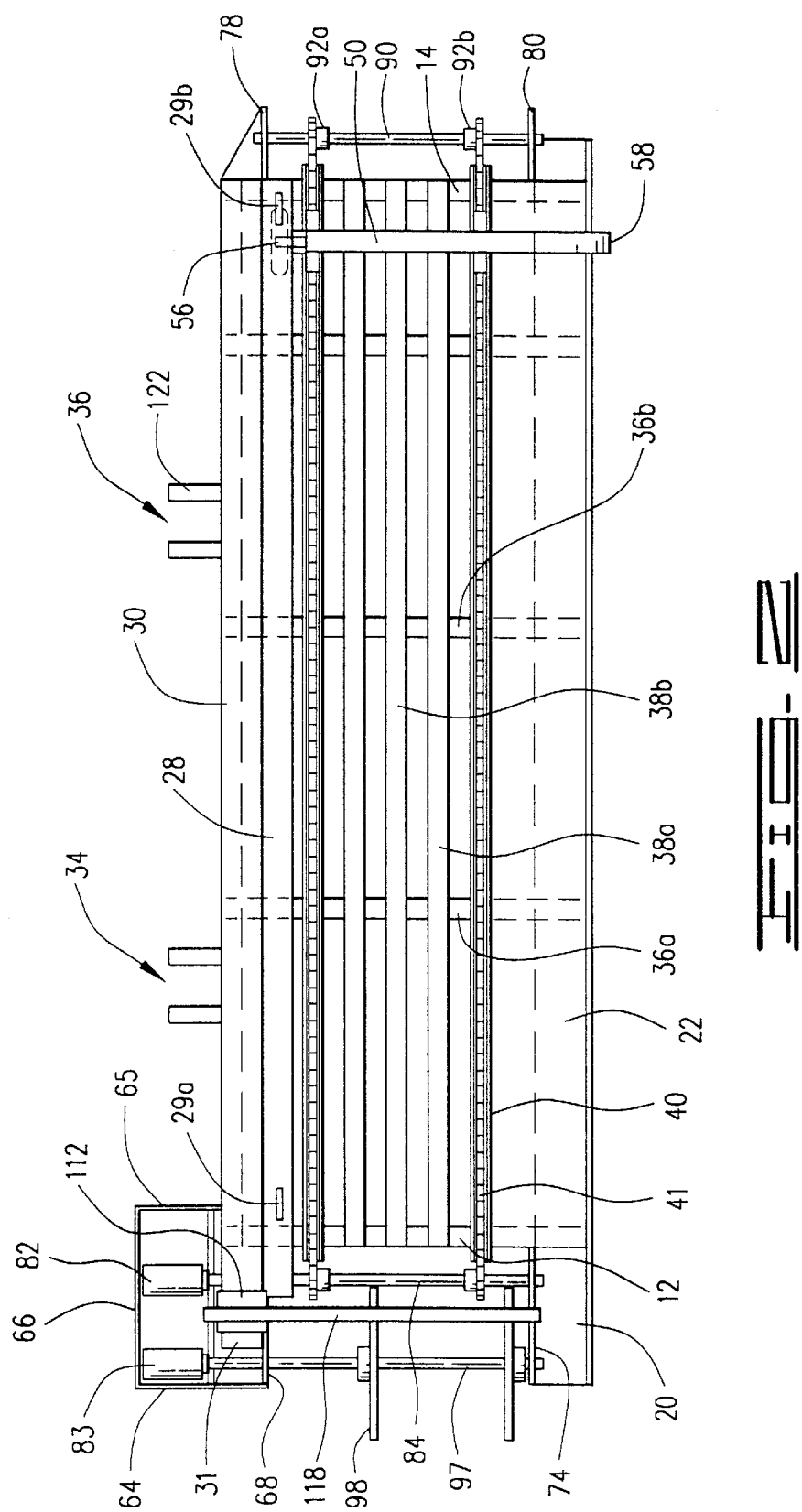
FIG. 2 is a top view of the hay flaking apparatus.
Figure 3:
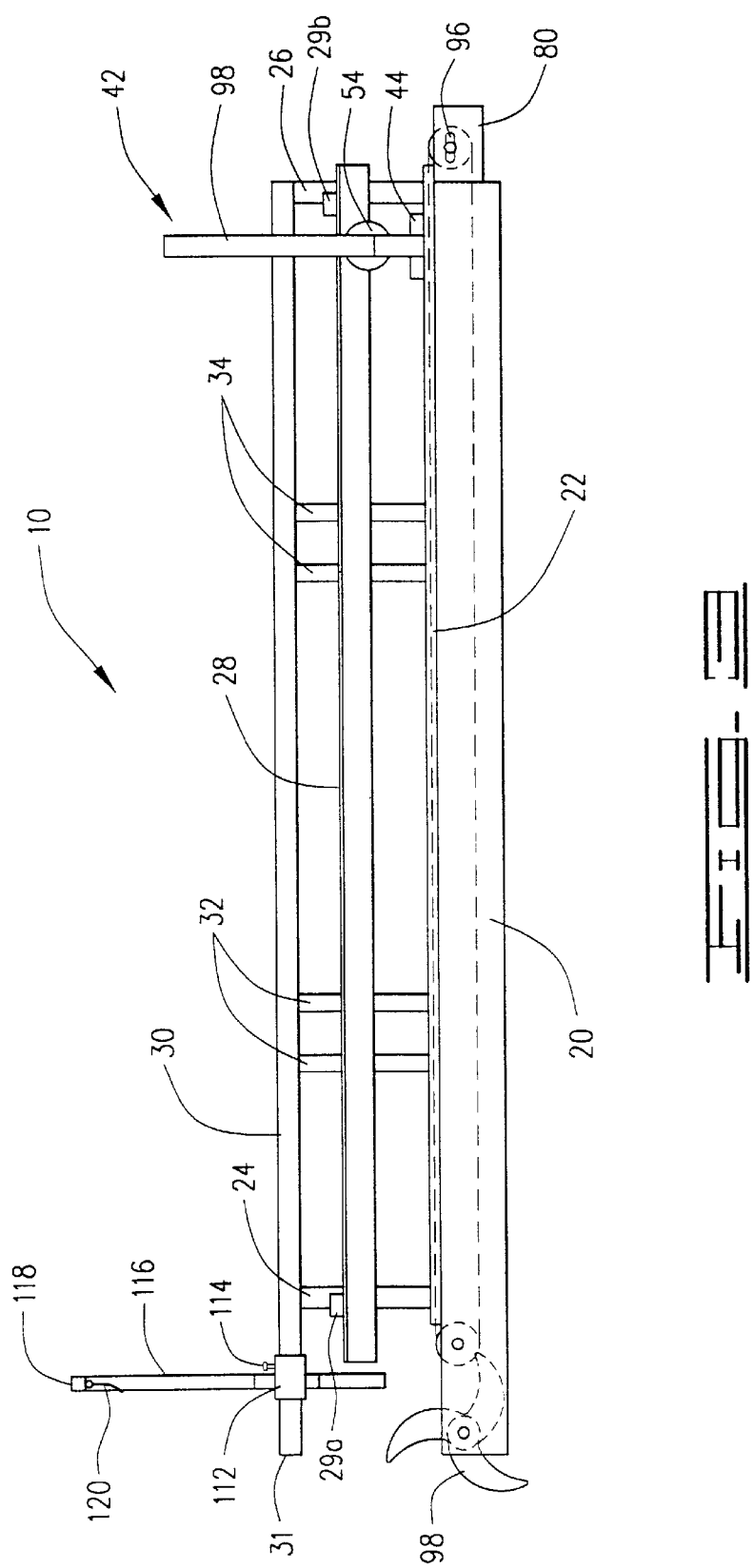
FIG. 3 is a front view of the hay flaking apparatus.
Figure 4:
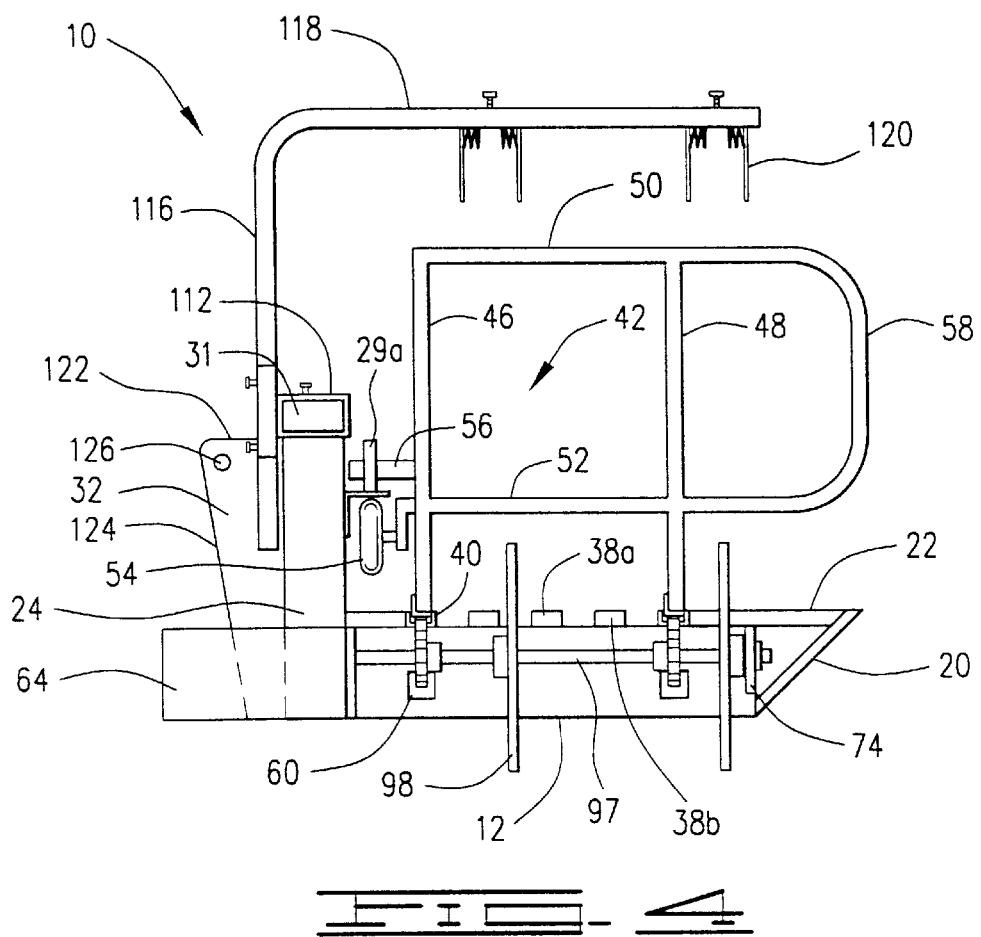
FIG. 4 is a side view of the hay flaking apparatus, looking at it from the side upon which the hay flaking mechanism is located.

The left mechanism frame 62 houses the chain motor 82 and the flaking motor 83. The left mechanism frame 62 is generally comprised of a left motor plate 64, a right motor plate 65 parallel thereto, a rear motor plate 66, joining the left and right motor plates, 64 and 65, and a front motor plate 68 parallel to the rear motor plate 66 adjoining an opposite end of the left and right motor plates, 64 and 65. Disposed within the left mechanism frame 62 is a chain motor mount 70 and a flaking motor mount 72. The left chain shaft 84 and the flaking shaft 97 pass through the front motor plate 68. At an opposite end, the two shafts, 84 and 97, pass through a left shaft plate 74. At each point where the shafts pass through a plate, a bearing is mounted to facilitate rotation thereof. At the opposite side of the apparatus 10, a right mechanism frame 76 is disposed. The right mechanism frame 76 can be seen in FIG. 2. It is comprised of a right rear shaft plate 78 and a right front shaft plate 80. The right chain shaft 90 passes through each of these plates with a bearing as it passes through, again to facilitate rotation. Also incorporated in the right mechanism frame 76 is an adjustable journal 96. The adjustable journal 96 can be seen if FIG. 3, though it is not shown in detail. The adjustable journal 96 allows the right chain shaft 90 to be moved towards or away from the right main frame member 14 to increase or decrease the tension on the chain 41, as may be needed.

Figure 5:
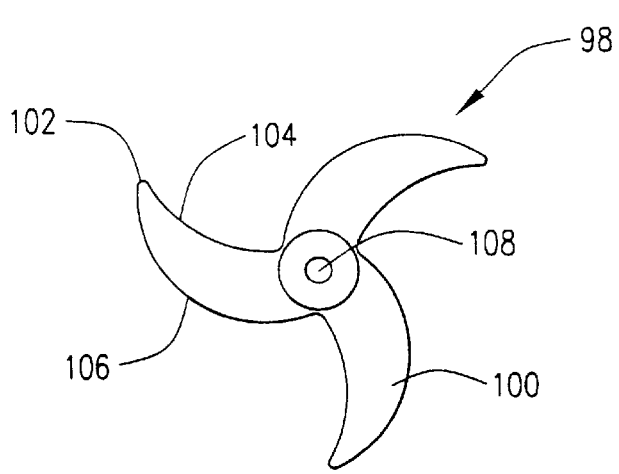
FIG. 5 is a detail of the flaking sprocket.

The flaking sprocket 98 is shown generally in FIG. 5. As shown, the flaking sprocket 98 has three fingers 100. Each finger 100 is comprised of a tip 102 where a concave leading edge 104 and a convex trailing edge 106 meet. The three fingers 100 are spaced evenly around a center hole 108. The center hole 108 is fixedly attached to the flaking shaft 97 with a set screw or the like. The flaking shaft 97, as noted, passes through the front loader plate 68 and the left shaft plate 74. It is disposed in a plane at or near the same plane as is defined by the support surface. Preferably, the support shaft is slightly below the plane formed by the support surface. The flaking motor 83 is set to rotate so that the fingers 100 upwardly engage the hay as it moves toward the flaking shaft 97.

A retainer bar 110 is attached near the proximal end 31 of the top rail 30 by a mounting bracket 112. The bracket may be held in place by a bracket set bolt 114. The retainer bar 110 is capable of being moved by loosening a set bolt 115. The retainer bar 110 is comprised of a vertical portion 116 and an overhang portion 118. Attached to the overhand portion 118 are spring loaded fingers 120. The retainer bar 110, in cooperation with the spring loaded fingers 120 prevents the hay from being thrown too far upwardly by the action of the flaking sprocket 98.

As shown, the hay bale flaking apparatus 10 is designed to be used with the front end loader linkage of a tractor 11. Thus, a left attachment plate pair 32 and a right attachment plate pair 34 are attached to the rear main frame member 16, extending upwardly, attaching to the top rail 30. Each attachment plate has an upper edge 122, a back edge 124, and a mounting hole 126. Once the front end loader mechanism is placed in close proximity to the attachment plate pairs, 32 and 34, a mounting pin 128 is passed through the mounting hole 126 and a corresponding hole in the tractor arms 130. It will also be necessary to provide another attachment point. The second attachment point could be similar, namely a set of mounting holes through which a mounting pin is passed.

As discussed above, the present invention could also be mounted on a trailer, mounted on the three-point hitch on the rear of a tractor, or any other similar attachment means. However, attachment to the front end loader linkage of a tractor is particularly convenient since it allows the hay bale flaking apparatus 10 to be moved upwardly and downwardly, as well as tilted at an angle. Power may be supplied to drive the chain motor 82 and the flaking motor 83 by a number of methods which are well established in the art. For example, U.S. Pat. No. 4,923,128 to Ostrowski discloses the use of either a PTO shaft or a high pressure oil stream. The tractor 11 drives a pump which generates the oil stream under pressure. The oil stream them passes through the motors generating power. Alternatively, the motors may be directly driven by a gear system deriving power from the PTO shaft. It is also possible that the system could utilize an independent power source such as an internal combustion motor mounted on the hay bale flaking apparatus 10.

OPERATION OF APPARATUS

In operation, a user first attaches the hay bale flaking apparatus 10 to the tractor 11. The apparatus is then moved adjacent to a hay bale to be picked up. The hay bale flaking apparatus 10 is then tilted at an angle so that the platform is substantially parallel to the side of the hay bale and the horizontal lip 132 is in frictional contact with another side of the bale. The platform is then tilted pulling the bale along until it is substantially horizontal, and the bale rests on the platform by force of gravity.

The Operator then moves the hay bale flaking apparatus 10 to the point where the hay is to be flaked. An operator first engages the flaking motor 83 at a low rate of speed. Next, the operator engages the chain motor 82 to bias the push bar 42 towards the left side of the hay bale flaking apparatus 10. As the hay bale is pushed toward the flaking sprockets 98, the fingers 100 engage the bale on the up stroke. The concave leading edge 104 pulls a flake of hay upwardly and away from the bale. The retainer bar 110 prevents the hay from flying upwardly, forcing it instead to move outwardly to the left away from the hay bale flaking apparatus 10. Using common controls on a tractor, the speed of both the chain motor and the flaking motor can be controlled so as to maximize the desired effect. The operator can also use the tractor forward or backwards as needed to dispense the hay to the proper location.

Once the hay bale has been flaked, the operator reverses the action of the chain motor, by moving the push bar into the far right hand position. The hay bale flaking apparatus 10 is then ready to receive another bale to be flaked.

Having thus described the field of the invention, the prior art, the attached drawings, the summary of the invention, and the detailed description of the preferred embodiments, I claim:

1. An improved hale bale separating apparatus, of the type having: a horizontal main frame defining a substantially flat support surface with a front edge, a rear edge, and a first and second side; a biasing means for moving a bale placed on the support surface towards the first side; a separation means on the first side for separating the bale into smaller portions; and a transportation means for moving the apparatus and the bale thereon to a place where the bale is to be separated; wherein the improvement comprises: the separation means comprised of a flaking shaft on substantially the same plane as the support surface, the shaft having at least one flaking sprocket mounted thereon, each sprocket bearing at least one tooth with a concave leading edge and a convex trailing edge, the two edges meeting at a tip, the shaft driven to rotate slowly so that the concave leading edge engages the bale on the up stroke thereby gently separating the bale into flaked portions and discharging the flaked portions up and away from the separation means so that the flaked portions remain relatively large and unbroken.

2. The flaking apparatus of claim 1 where the flaking shaft has mounted thereon two flaking sprockets, each sprocket having three fingers thereon.

3. The apparatus of claim 2 where the biasing means is a push bar driven by a chain mechanism.

4. The apparatus of claim 3 where the transport means is a tractor with a front end loader to which the apparatus is mounted, and having a power means for providing power to drive the biasing and separation means, the front end loader mechanism also allowing the apparatus to be raised, lowered, and tilted at an angle.

5. The apparatus of claim 4 further comprising an upright portion extending upwardly from the rear edge of the support surface, the upright portion having a top rail and a guide rail disposed between the top rail and the support surface, the guide rail having a horizontal lip which extends outwardly towards the front so that when the platform is lowered adjacent to a hay bale and the support platform is tilted, the lip engages the bale which is pulled back onto the support platform and the platform is returned to a horizontal position.

6. The apparatus of claim 5, the push bar having a guide wheel extending therefrom which rollingly engages the lip of the guide rail to stabilize the push bar.

7. The apparatus of claim 6, the guide rail having a push bar block mounted on at least one of its ends to engage a corresponding push bar stop on the push bar to prevent the push bar from traveling too far in at least one direction.

8. The apparatus of claim 7 further incorporating a retainer bar mounted on the top rail for preventing the flaked hay from being thrown upwardly too far by the action of the flaking sprocket.

9. A method of flaking hay comprising the steps of:
   (a) providing the apparatus of claim 1;
   (b) loading a hay bale onto the support surface;
   (c) engaging the separation means;
   (d) engaging the biasing means; and
   (e) moving the apparatus so as to discharge the flaked hay at the desired location.

10. A method for separating a hay bale comprising:
   a. providing the device of claim 1;
   b. rotating the shaft so that the concave leading edge engages the bale on an up stroke thereby gently separating the bale into flaked portions; and
   c. discharging the flaked portions up and away from the separation means so that the flaked portions remain relatively large and unbroken.

* * * * *